April 2, 1935.  W. POLLEY  1,996,687
SAW BLADE
Filed May 24, 1933
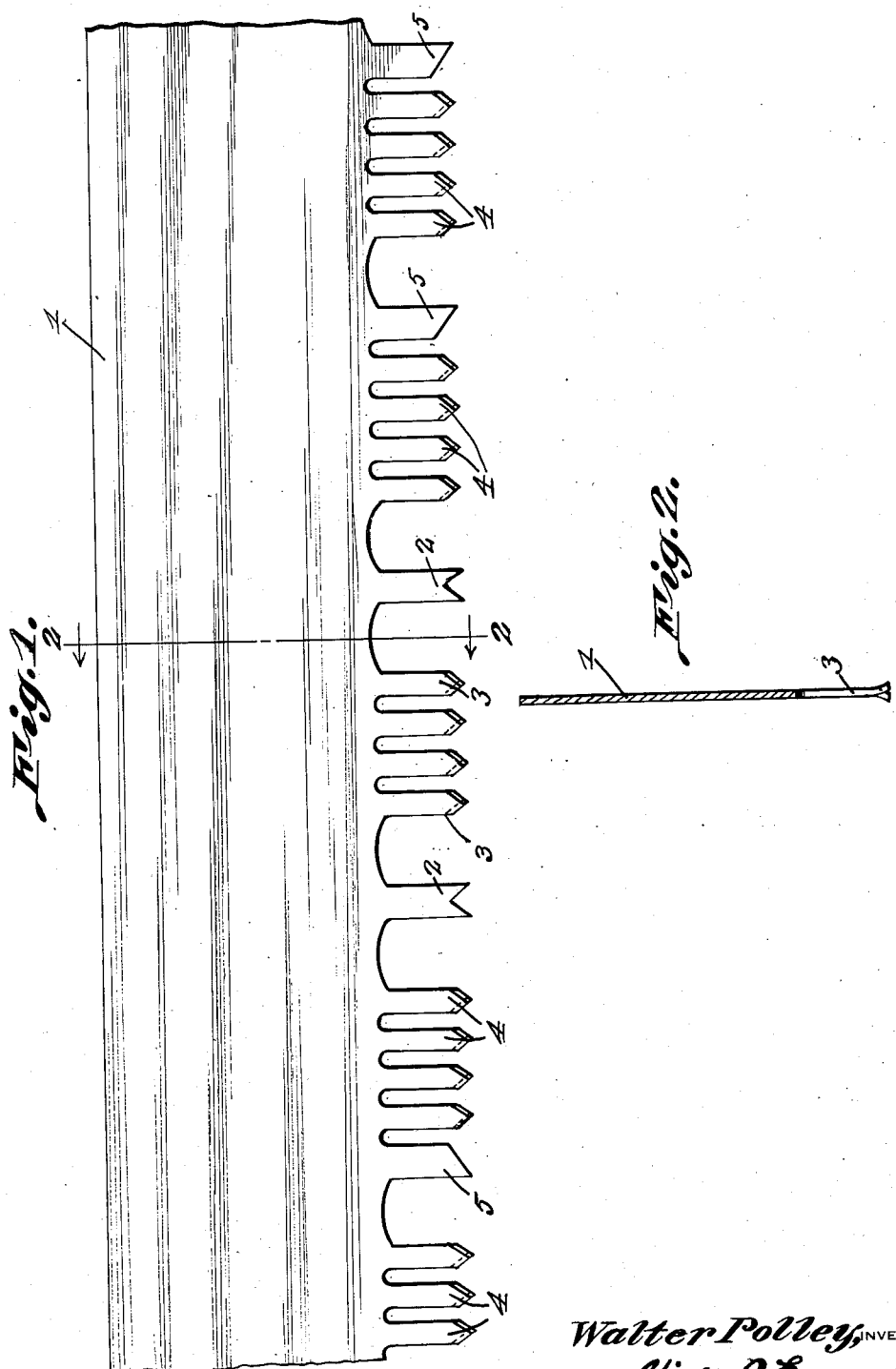

Patented Apr. 2, 1935

1,996,687

UNITED STATES PATENT OFFICE 1,996,687

SAW BLADE

Walter Polley, Marcola, Oreg.

Application May 24, 1933, Serial No. 672,713

1 Claim. (Cl. 143—133)

This invention relates to saws, and its general object is to provide a saw blade with double and single pointed raker or clearing teeth arranged with respect to groups of cutting teeth in a manner whereby the saw is capable of use in cutting easily and expeditiously with minimum effort and much faster and with more efficiency than saws now in general use.

Another object of the invention is to provide a saw blade primarily designed for use with power actuated portable drag saw devices, but can be used with any power driven unit, and is simple in construction, easy to sharpen, inexpensive to manufacture and extremely efficient for the purpose intended.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a fragmentary view of a saw blade constructed in accordance with the present invention.

Figure 2 is a sectional view taken approximately on line 2—2 of Figure 1, looking in the direction of the arrows.

Referring to the drawing in detail, the reference numeral 1 indicates the saw blade body, and it might be stated that I have illustrated the central portion of the blade, due to the fact that the double pointed raker teeth are arranged only at the central portion of the blade while the portions of the blade upon the opposite sides of the central portion are provided with single pointed raker teeth.

In fact, in the form of the saw blade shown, I employ only two double edged or pointed raker teeth, which are indicated by the reference numeral 2 and are arranged upon opposite sides of and in spaced relation with respect to a group of cutting teeth 3 as well as a relatively great distance therefrom, as shown, while arranged upon the outer sides of the raker teeth 2 a relatively great distance therefrom as well as from each other, as shown, are spaced groups of teeth, and each of the last mentioned groups include at least four cutting teeth 4 and one single edged or pointed raker tooth 5 which is disposed upon the outer side of the cutting teeth 4 in each of their groups, so that a raker tooth 5 will be disposed between each of the groups of cutting teeth.

It might be further stated, that at least four cutting teeth are employed in the group between the double pointed raker teeth, and the double points or raking edges of the raker teeth 2 are provided by forming a V-shaped recess in the lower end thereof, while the single pointed raker teeth upon one side of the double pointed raker teeth have their lower ends inclined outwardly toward one end of the blade, and the single pointed raker teeth on the opposite side of the double pointed raker teeth have their lower ends inclined toward the opposite end of the blade, so that their points or raking edges will be arranged accordingly, and the single pointed raker teeth are disposed outermost at one end of the cutting teeth 4 in their respective groups, as clearly shown in Figure 1.

The cutting teeth are each provided with the usual V-shaped lower end, with a portion of one side beveled and the opposite portion of the other side beveled, and these beveled portions are directed in opposed relation with respect to each other as clearly shown in Figure 2. Of course, the points of all the teeth terminate in alignment with each other as shown in Figure 1.

From the above description and disclosure of the drawing, it will be obvious that I have provided a saw blade that is capable of use in cutting, in an easy and expeditious manner with very little effort, due to the fact that the discharge of saw dust from the kerf cut by my blade is unobstructed, therefore the cutting teeth can perform their intended function without interference. This advantageous feature is brought about by the particular structure of the raker teeth which are straight edged on the faces, transversely to the plane of cut and mainly from the particular arrangement of the raker teeth 2 with respect to the group of cutting teeth 3, and the arrangement of the other groups of teeth, as shown. It will be noted from the drawing that the points of the raker teeth 2 are spaced from the points of the teeth 3 several times the distance of the space between the teeth themselves and that the groups which contain the cutting teeth 4 and the single pointed raker teeth 5 are spaced from and upon the outer sides of the raker teeth 2 and from each other the same distance as the space between the raker teeth 2 and the cutting teeth 3, therefore it is practically impossible for the dust to obstruct the cutting teeth.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A saw blade comprising a body, a group of cutting teeth arranged substantially midway the ends of said body, a double pointed raker tooth disposed upon opposite sides of the group, with their innermost points spaced from the points of the outer cutting teeth several times the distance of the space between the respective cutting teeth, teeth arranged in groups spaced from and upon the outer sides of the raker teeth and from each other the same distance as the space between said raker teeth and the outer cutting teeth, each of the last mentioned groups containing a plurality of cutting teeth and one single pointed raker tooth, the single pointed raker teeth being disposed in close proximity to the cutting teeth of their group and outermost on the outer sides thereof, with their points arranged accordingly, and said raker teeth being straight edged on their faces transversely to the plane of cut.

WALTER POLLEY.